United States Patent [19]
Buck

[11] Patent Number: 5,818,057
[45] Date of Patent: Oct. 6, 1998

[54] SIMULTANEOUS LUMINESCENCE PRESSURE AND TEMPERATURE MAPPING

[75] Inventor: Gregory M. Buck, Newport News, Va.

[73] Assignee: The United States of America as represented by the United States National Aeronautics and Space Administration, Washington, D.C.

[21] Appl. No.: 726,993

[22] Filed: Oct. 7, 1996

Related U.S. Application Data

[63] Continuation of Ser. No. 492,686, Jun. 20, 1995, abandoned.
[51] Int. Cl.⁶ .................................................. G01N 21/64
[52] U.S. Cl. ........................................................ 250/459.1
[58] Field of Search .......................................... 250/459.1

[56] References Cited

U.S. PATENT DOCUMENTS

4,885,633  12/1989  Buck ........................................ 358/93
5,151,603   9/1992  Nakamura ............................. 250/458.1
5,341,676   8/1994  Gouterman et al. ...................... 73/147

*Primary Examiner*—Constantine Hannaher
*Attorney, Agent, or Firm*—Kimberly A. Chasteen

[57]  ABSTRACT

A simultaneous luminescence pressure and temperature mapping system is developed including improved dye application techniques for surface temperature and pressure measurements from 5 torr to 1000 torr with possible upgrade to from 0.5 torr to several atmospheres with improved camera resolution. Adsorbed perylene dye on slip-cast silica is pressure (oxygen) sensitive and reusable to relatively high temperatures (~150° C.). Adsorbed luminescence has an approximately linear color shift with temperature, which can be used for independent temperature mapping and brightness pressure calibration with temperature.

8 Claims, 13 Drawing Sheets

SIMULTANEOUS LUMINESCENCE PRESSURE AND TEMPERATURE MAPPING

This is a continuation of application Ser. No. 08/492,686 filed on Jun. 20, 1995, now abandoned.

ORIGIN OF THE INVENTION

The invention described herein was made by an employee of the United States Government and may be used by and for the Government for governmental purposes without the payment of any royalties thereon or therefor.

BACKGROUND OF THE INVENTION

1. Technical Field of the Invention

The present invention relates generally to pressure and temperature mapping systems, and more particularly to simultaneous temperature mapping systems for use at high temperatures.

2. Discussion of the Related Art

Advanced diagnostic techniques capable of nonintrusive global measurement of aerodynamic pressure and heating distributions on models tested in hypersonic wind tunnels will significantly enhance the design and assessment process of future aerospace vehicles. Considerable progress has been made in measuring global temperature distributions with time, hence global heating distribution, via relative intensity thermographic phosphor and infrared emission techniques, but global pressure measurements at hypersonic conditions continue to elude experimental aerothermodynamicists. Pressure mapping techniques using photoluminescence offer a potential savings in time and expense for wind-tunnel testing over conventional pressure instrumentation (i.e. discrete measurements via transducers) and are sought for hypersonic wind-tunnel applications.

Luminescence pressure mapping techniques have been developed and tested broadly by government agencies, industries, and universities for lower-speed applications. Current techniques use oxygen sensitive luminophores in polymer binders for pressure sensitive paints which can be applied to a variety of surfaces. Paint applications, however, are limited in high-temperature stability and time response by polymers. Temperature effects on induced luminescence further complicate pressure measurements in high-speed application with aerodynamic heating. Recent work was done to calibrate temperature effects on paint luminescence for wind-tunnel measurements using separate temperature mapping data. The results of this work and similar applications may expand near-term testing capabilities for relatively low enthalpy, long test duration facilities, but innovative solutions are needed for the bulk of hypersonic testing (i.e. M>6, moderate to high enthalpy, blowdown and impulse facilities) including an internal method for thermal calibration, higher-temperature stability and faster response times.

It is accordingly an object of the present invention to provide a system for simultaneously mapping temperature and pressure.

It is another object of the present invention to provide a system for simultaneously mapping temperature and pressure at high temperatures.

It is a further object of the present invention to provide a system for simultaneously mapping temperature and pressure with reduced response time.

It is a further object of the present invention to provide a system for simultaneously mapping temperature and pressure which is suitable for use in hypersonic facilities.

It is yet another object of the present invention to accomplish the foregoing objects in a simple manner.

Additional objects and advantages of the present invention are apparent from the drawings and specification which follow.

SUMMARY OF THE INVENTION

According to the present invention, the foregoing and additional objects are obtained by providing a method for simultaneous mapping of temperature and pressure on an member, including the steps of applying a luminescent material, preferably perylene, to the surface of the member, exciting the luminescent material, measuring the resulting emissions, and determining the pressure and temperature on the surface of the member. The luminescent material may be excited using a blue light or long-wave ultraviolet light and the resulting emissions are measured using a two-color imaging system. The preferred method for applying the luminescent material is polishing the surface of the member, saturating the surface with the luminescent material, heating the saturated member, and repolishing the heated member. The member may be a slip-casted ceramic.

DETAILED DESCRIPTION OF THE INVENTION

The effects of oxygen interaction on luminescence yields and lifetimes are well documented for many substances since oxygen is an active quencher of fluorescence and phosphorescence. For some materials, quenching rates and efficiencies are large enough to make them useful as oxygen indicators. Theory predicts the quenching process to obey the Stern-Volmer equation:

$$\frac{I}{I_0} = \frac{1}{1 + K[O_2]} \quad (1)$$

for constant temperatures, where l and $l_0$ are the fluorescence intensities in the presence and absence, respectively, of oxygen. In a mixed gas such as air, the oxygen concentration $[O_2]$ is simply replaced by the partial gas pressure. K is the oxygen quenching coefficient which can be calibrated for many different luminescent materials.

Few guidelines exist for luminescence temperature dependence in oxygen sensors. Temperature is known, however, to affect quantum yield, quenching (Stern-Volmer) coefficient, and solubility and diffusion rates in binders.

Following initial luminescence measurements and calibration on ceramic test samples, perylene dye was applied to ceramic models and tested in a hypersonic wind tunnel. Models tested included a 0.02 scale model of a proposed personnel launch vehicle (HL-20) and a 0.0075 scale shuttle orbiter model. Both models represent configurations that had been previously slip-cast and tested using two-color luminescence thermography and infrared mapping techniques. The luminescent perylene dye (Greengold) has reported green emission (520 nm) with blue-light excitation (460 nm) and is a commercially manufactured product used in coloring plastics. In adsorbed films on silica, an additional component of red emission was found on prepared samples.

Models were tested in a 31-inch Mach 10 wind tunnel. Measurements were made with a two-color imaging system which was developed for luminescence thermography. Simultaneous green and red filtered images of dye luminescence were recorded in which camera outputs are represented by $$I_g = \int s_g(\lambda) l(\lambda) d\lambda \quad (2)$$

$$I_r = \int s_r(\lambda) l(\lambda) d\lambda \quad (3)$$

where $l(\lambda)$ is the surface emission intensity with wavelength and $s_g(\lambda)$ and $s_r(\lambda)$ are the green and red detector sensitivities, respectively. Dye application and testing provided mixed results. Testing primarily demonstrated a need for improved model preparation and application techniques. Perylene dye was applied to models in a solution with toluene via dipping, spray and brushing; however, in each case measurement anomalies from ceramic contaminants were apparent or quenching coefficients were significantly lowered. Later studies show a more preferred method for applying the dye which is described below.

Although quenching coefficients were minimal, adsorbed dye luminescence was shown to be stable except in stagnation regions which exceeded 200° C. surface temperatures in three second run times (Mach 10 flow, stagnation temperature>730° C., stagnation pressure>8600 KPa). Long-wave ultraviolet (UV)(365 nm) excitation was also used for irradiance over model surface areas with bright luminescence. Quantum efficiencies are known to be lower for UV than for blue light excitation (~12%); however, advantages in using UV are readily accessible lamp supplies (mercury-arc lamps), which are in current use for luminescence thermography, less cost than with blue-light lasers or filtered Xenon lamps, and simpler and more efficient image filtering with better excitation-emission wavelength separation. Effects of photodegradation were also shown to be negligible.

Testing was performed in a vacuum oven chamber for development of dye application methods. Adsorbed films were previously applied to samples with a metered dropper which could not be replicated on test model surfaces. A subsequent technique was developed for consistent application. Additionally, effects of dye concentration were analyzed to determine optimum application thickness. Calibration measurements are shown for test samples and range and resolution of pressure measurements are determined.

For consistent dye application on ceramic matrix, a model is first polished with successively finer grits of silicon-carbide paper to a highly-smooth finish. Polishing residue is removed with solvent. The surface is then saturated by brush or dipped in a specific dye concentration with toluene. It is then allowed to dry and baked in a clean convection oven for thirty minutes at 160° C. Saturation and baking are repeated to ensure uniform application. Finally, the surface is re-polished with silicon-carbide paper removing accumulated dye layers on the exposed surface, hence, isolating film adsorption to ceramic pores which are more directly regulated by saturated dye concentration.

Figure 1:
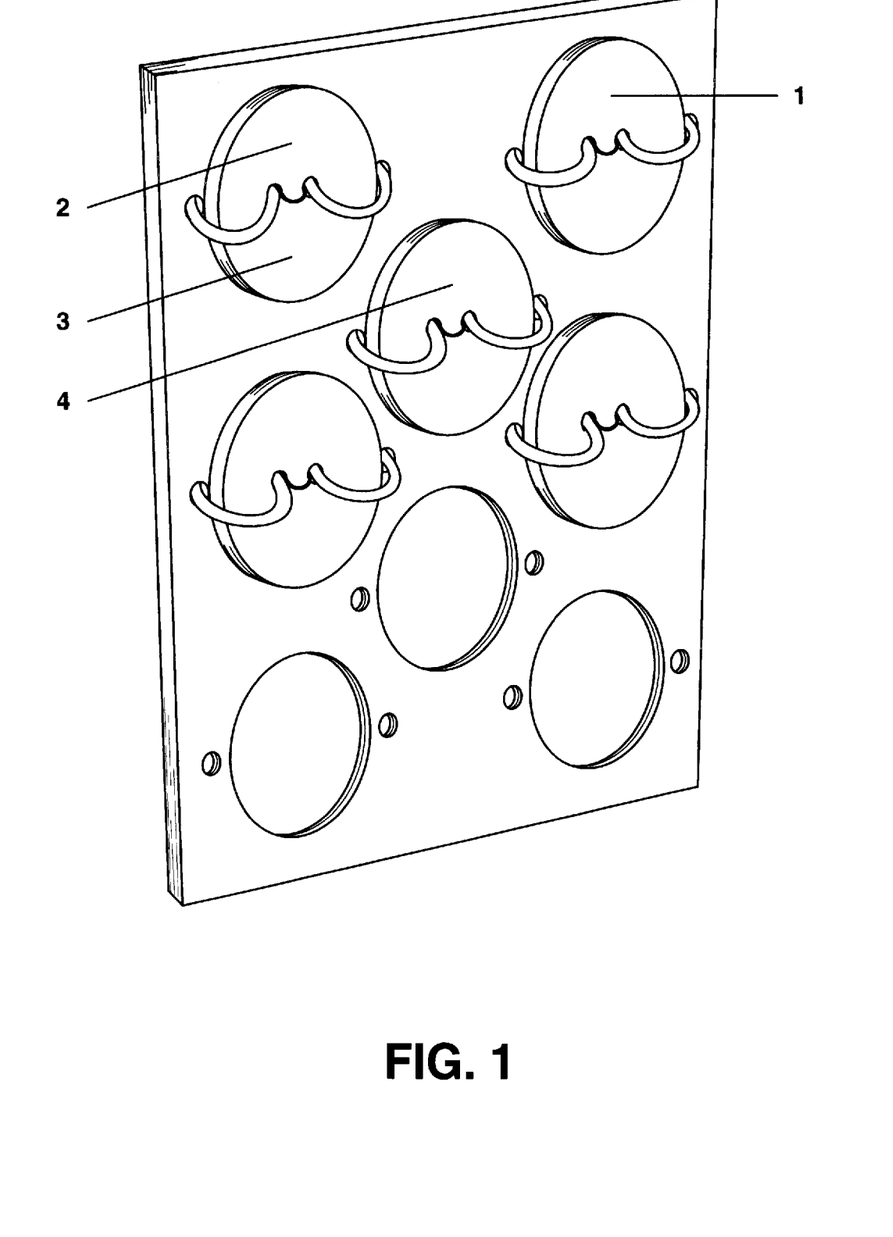
FIG. 1 is a figure showing the mounting of test samples.

Ceramic disk samples were machined, 1-mm thick, from slip-cast silica rods 1.27-cm diameter and drilled with 0.60-mm holes for mounting. Following dye application, samples were mounted as shown in FIG. 1 to electrical connectors in a ceramic block with butt-welded 0.076-mm diameter type K thermocouple wire and 0.51-mm diameter leads. As many as 5 test samples were mounted per test.

Through a test chamber window, image sampling regions are indicated in FIG. 1 with numbers 1 through 4. Region 1 is taken from an analysis sample prepared with low dye concentration. Regions 2 and 3 are from a test sample with optimum dye concentration and region 4 is taken from a test sample with much greater dye concentration. The test chamber was constructed from a 20.5-cm diameter pipe, lined with 2.54-cm thick low-density alumina ceramic insulation, fitted with an electrical resistance heater and o-ring sealed with a 2.54-cm thick quartz viewing window.

Chamber pressure was controlled via a vacuum pump and venting to atmosphere and was measured with a 1000 torr variable capacitance pressure transducer and Hastings vacuum gage down to 0.1 torr. Chamber insulation was effective in providing stable temperatures up to 150° C., taking approximately 4 to 6 hours for the chamber to cool from 150° C. to room temperature at 0.5 torr.

Figure 2:
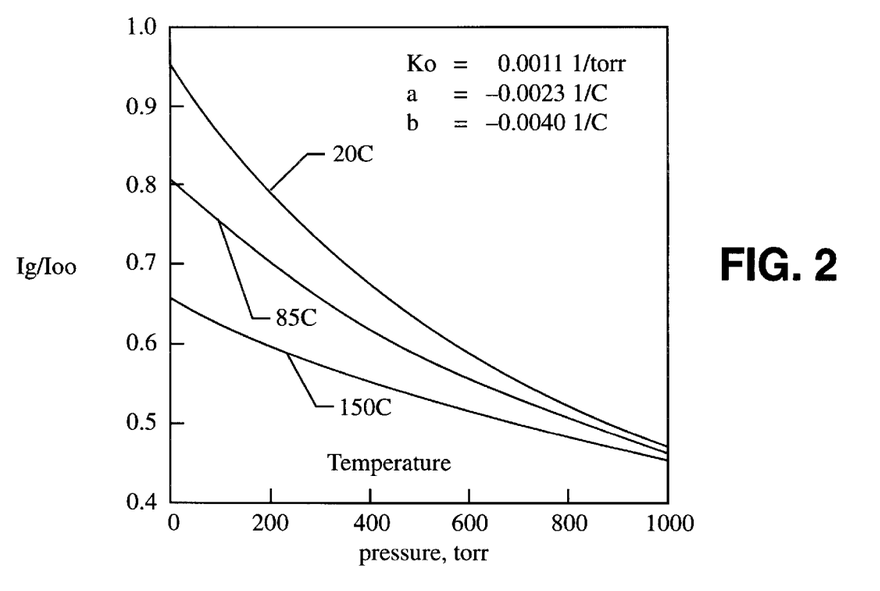
FIG. 2 is a graph showing emission brightness vs. pressure model at constant temperatures.

Measurements made in the vacuum oven revealed an approximately linear shift in quantum efficiency $l_0$ and quenching coefficient K in Equation (1) with temperature. Experimental data could be approximated to first order from Eqn. (1) for green brightness measurements as $$\frac{I_g}{I_{00}} = \frac{(1 + aT)}{1 + K_0(1 + bT)^P} \quad (4)$$

where $l_{00}$ is a calibration coefficient for reference brightness at zero pressure and temperature, a and b are temperature constants for quantum yield and oxygen quenching and $K_0$ is the quenching constant at zero temperature with P being measured air pressure, assuming constant oxygen ratio. A plot of Eqn. (4) with experimentally derived constants is shown in FIG. 2 for air pressure at constant temperatures.

Figure 3:
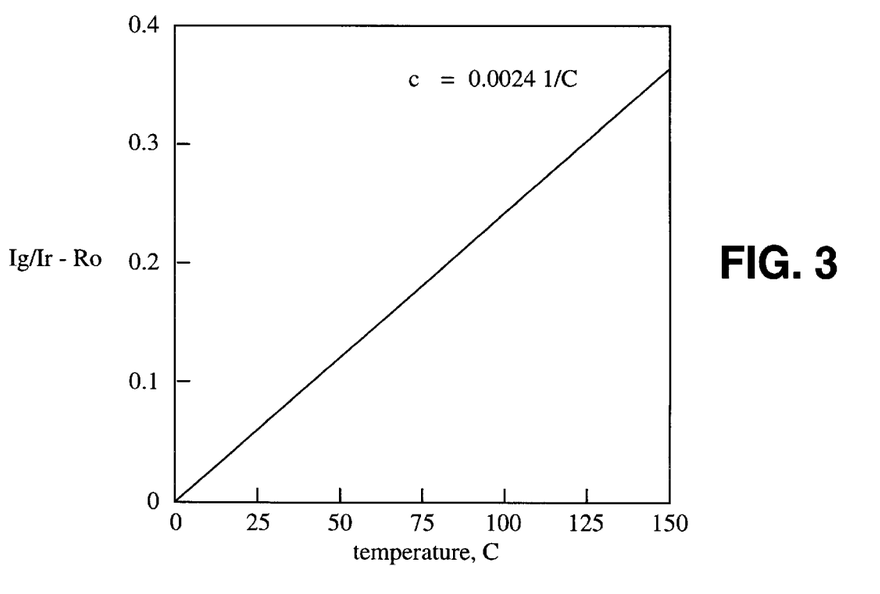
FIG. 3 is a graph showing ratio difference vs. temperature.

An approximately linear shift in emission color with temperature was observed from adsorbed perylene dye from 20° C. to 150° C. with a two-color imaging system. This characteristic was not expected but is highly desirable for temperature measurement and calibration. This allows for development of a system with a single dye application and simplifies filtering of broadband emission for diagnostics. In addition, color-ratio measurements were found to be independent of pressure and excitation irradiance. A linear approximation for green-to-red brightness ratio with temperature is given as $$\frac{I_g}{I_r} - R_0 = cT \qquad (5)$$

where c is the color-ratio temperature sensitivity and was found to be constant over a broad range of applications. $R_0$ is a calibration coefficient for color ratio at zero temperature and was found to vary from sample to sample with apparent film thickness. A plot of Eqn. (5) is shown in FIG. 3 for temperature with experimentally derived constant c.

Image sampling regions consisted of 10×10 element pixel arrays and were averaged and treated as point data. Individual brightness response was calibrated separately for each sample region and color using a calibrated uniform intensity light source, or integrating sphere, with micrometer controlled aperture brightness and 2855K color temperature. (Photometric units in candela/m$^2$).

Figure 4:
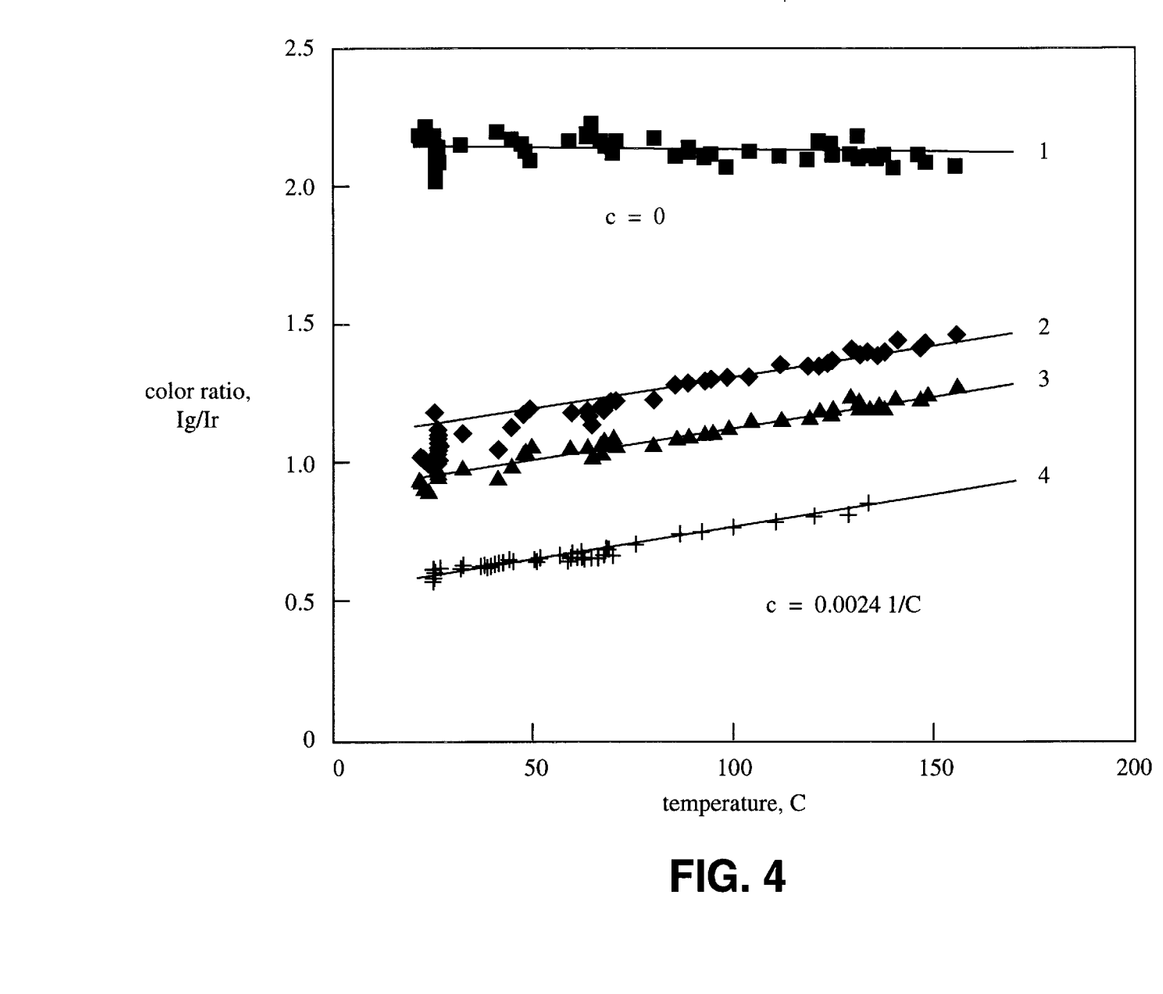
FIG. 4 is a graph showing color ratio data versus temperature.

Data was taken simultaneously for regions 1 through 3 in a recent experiment (see FIG. 6), and from a previous experiment for region 4, in which temperature, pressure and excitation irradiance were varied. Experiment results are shown in FIG. 4 for color ratio data versus temperature. Color-ratio bias (coefficient $R_0$ in Eqn. (5)) is shown to vary from regions 2 to 3 on the same sample disk. Sensitivity coefficient (c in Eqn. (5)) is shown, however, to be constant for regions 2 through 4, approaching zero in region 1 for thinner adsorption. Determination of quenching constants showed similar values for regions 1 through 3 ($K_0$=0.0011 torr$^{-1}$), and much lower value for region 4 ($K_0$=0.0005 torr$^{-1}$).

Figure 5A:
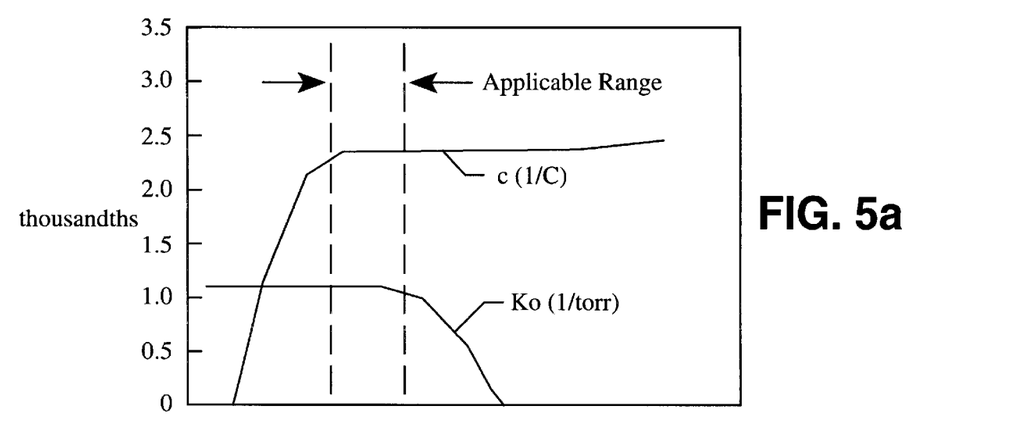
FIG. 5a is a graph showing temperature sensitivity and quenching constants vs. adsorbed film thickness.
Figure 5B:
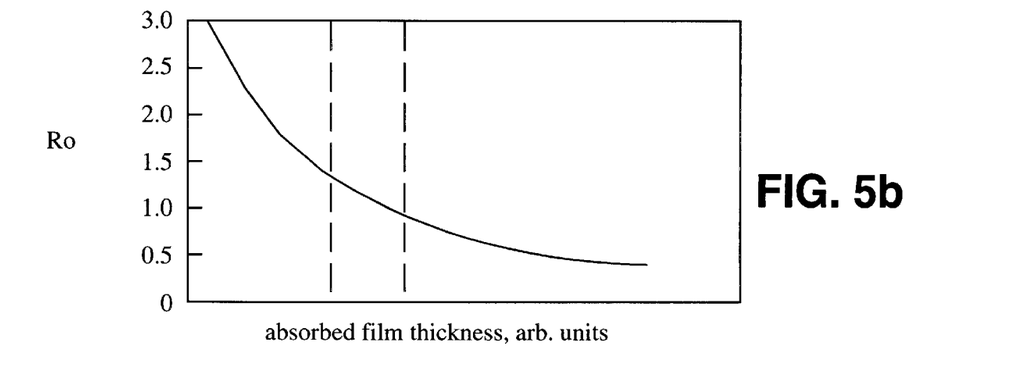
FIG. 5b is a graph showing reference color ratio vs. adsorbed film thickness.

From this data and similar observations FIGS. 5(a) and (b) were constructed as a guide for future dye applications. Stable values of temperature sensitivity and quenching constants (c and $K_0$) are shown to exist over a range of film thicknesses corresponding to a range of calibration coefficient $R_0$ roughly from 0.9 to 1.4.

Independent effects on quenching coefficient also include ceramic contaminants, interference with humidity and other gases, and later surface contaminants from handling and tunnel environments. Possible humidity effects are noted but are expected to be less of a concern in dry tunnel air supplies. Later surface contaminants may also be removed with most alcohols since the perylene dye is not easily soluble.

Test conditions for recent experiments are shown in FIGS. 6. (a) to (d). Data series were taken from four contiguous runs made over a three-day period. The longest run was several hours in duration. The first run began shortly after installing samples and evacuating the test chamber. From data points zero through 56, the vacuum oven was sealed except through a vent to atmosphere during pressure sweeps. Between points 56 and 59, the chamber was vented to atmosphere overnight with the quartz window removed. Points 59 to 61 were taken during re-evacuation from atmosphere to vacuum for the final run. A gap is shown between data points 61 and 64 to indicate changes made in camera gains.

Figure 6A:
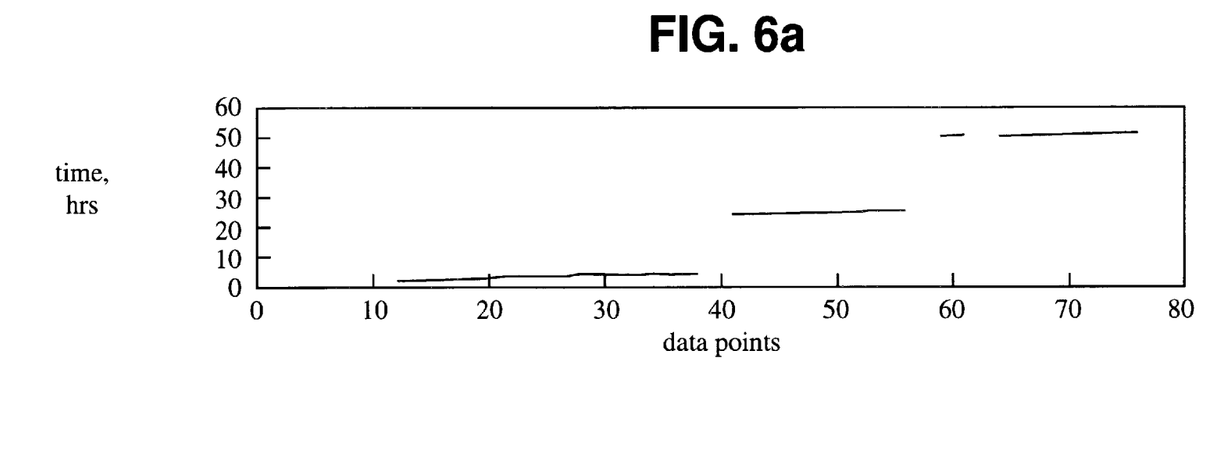
FIG. 6a is a graph showing time vs. data points.
Figure 6B:
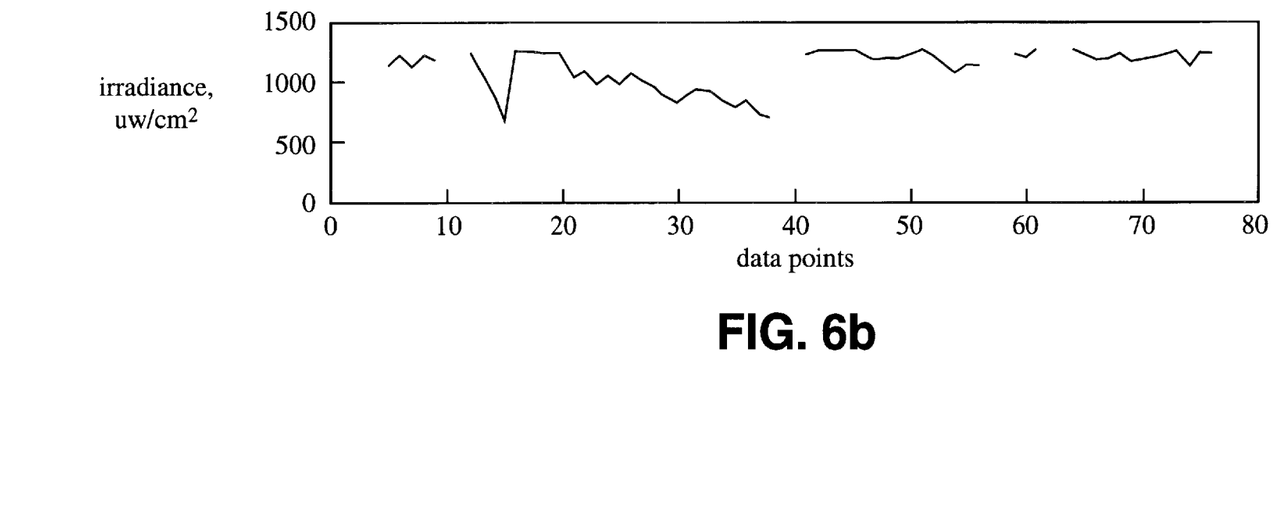
FIG. 6b is a graph showing irradiance vs. data points.
Figure 6C:
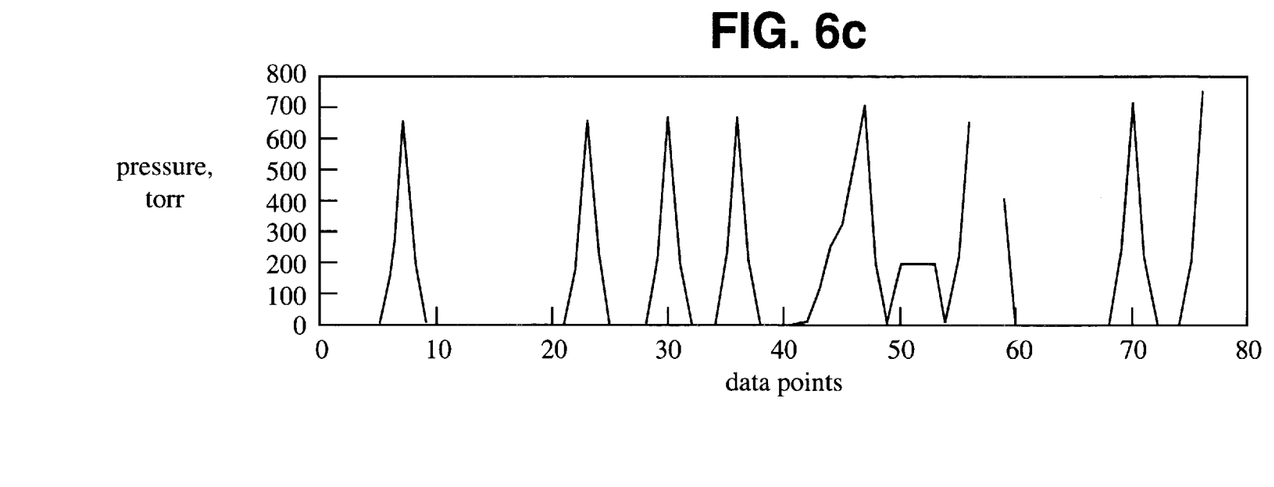
FIG. 6c is a graph showing pressure vs. data points.
Figure 6D:
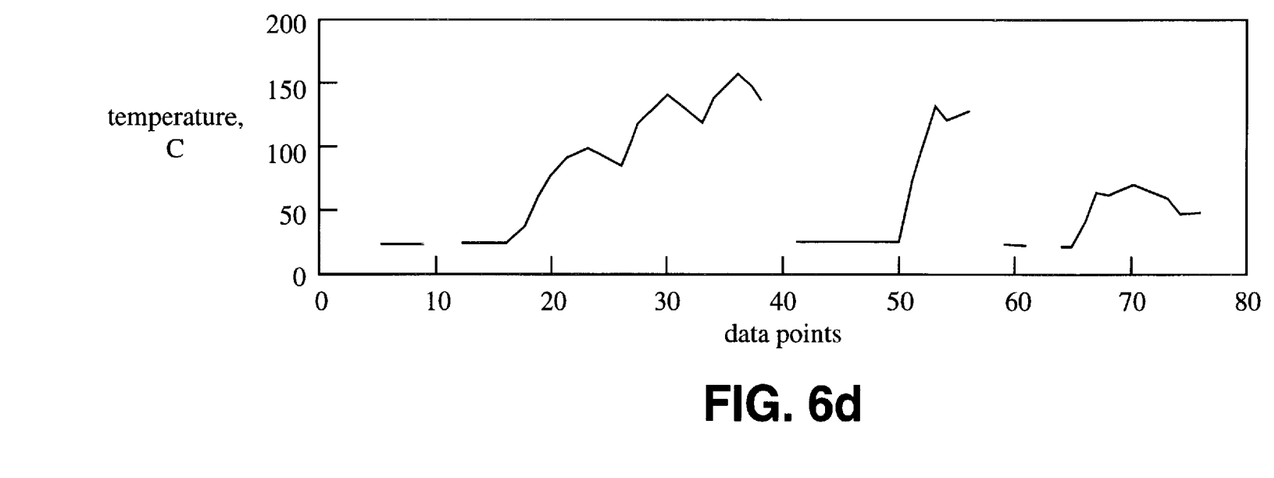
FIG. 6d is a graph showing temperature vs. data points.
Figure 7A:
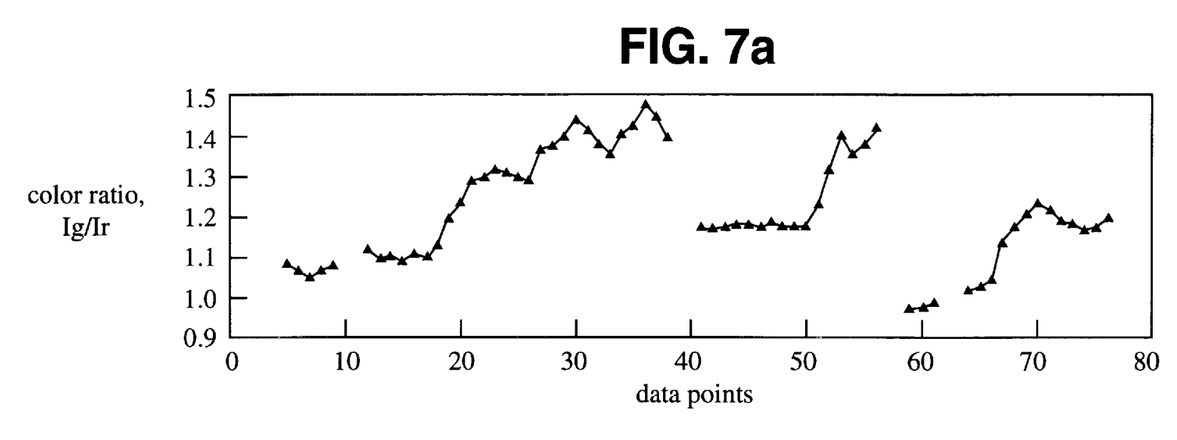
FIG. 7a is a graph showing color ratio vs. data points for sample region 2.
Figure 7B:
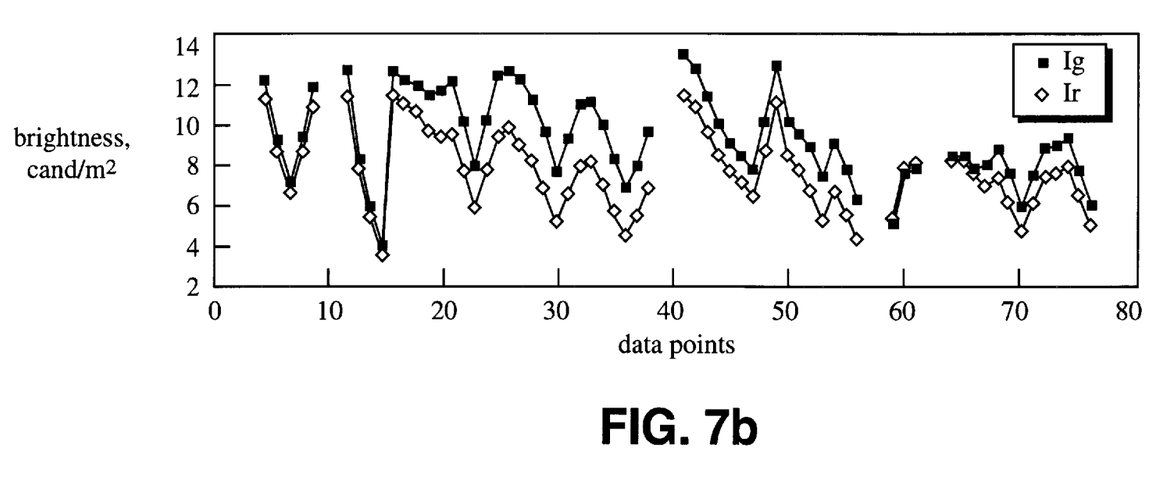
FIG. 7b is a graph showing brightness vs. data points for sample region 2.
Figure 7C:
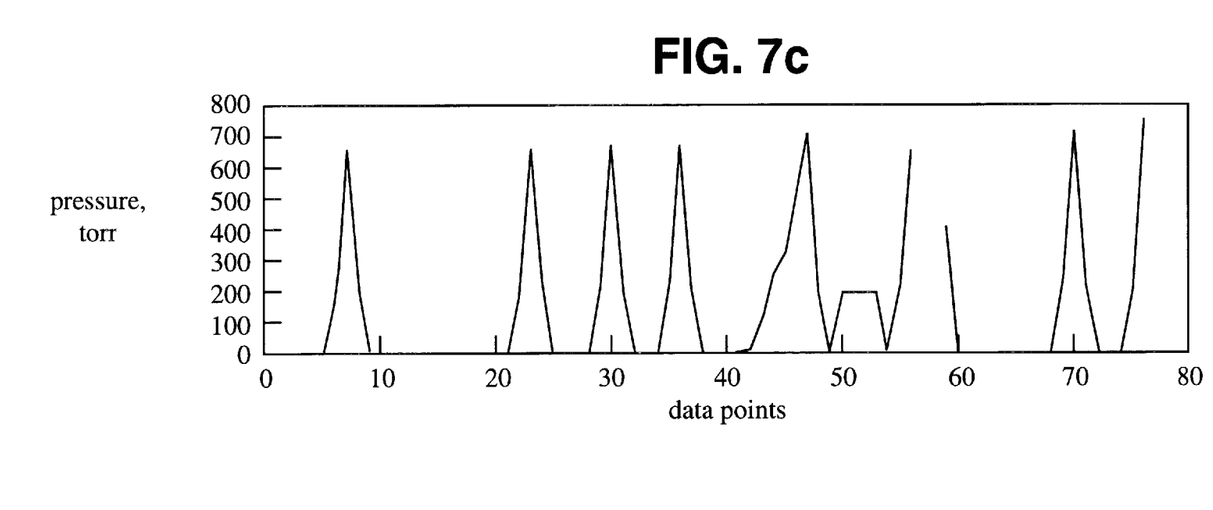
FIG. 7c is a graph showing pressure vs. data points for sample region 2.
Figure 7D:
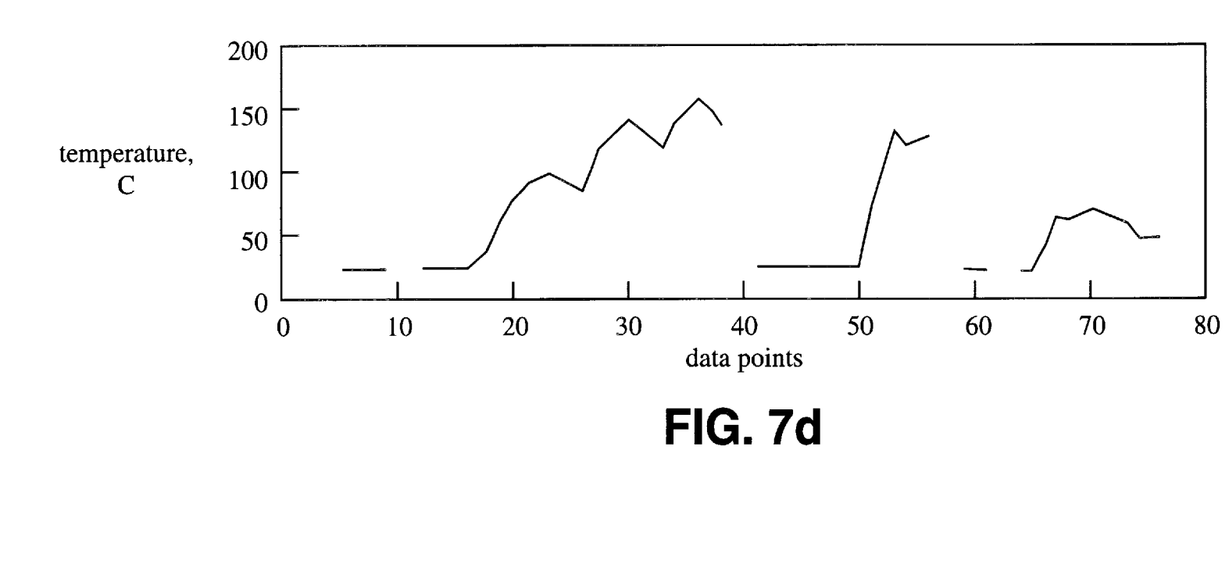
FIG. 7d is a graph showing temperature vs. data points for sample region 2.
Figure 8A:
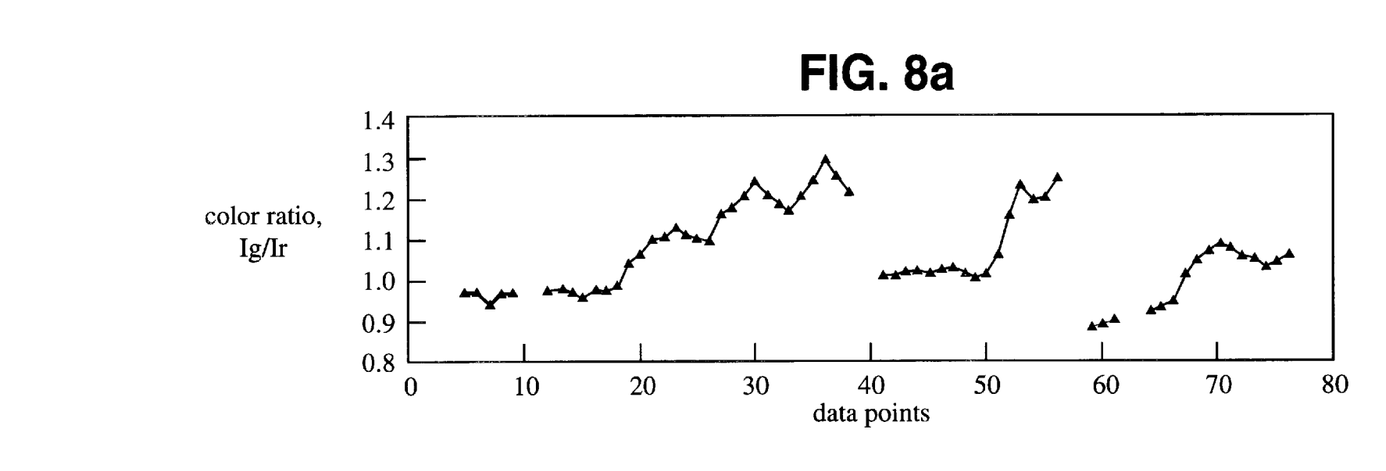
FIG. 8a is a graph showing color ratio vs. data points for sample region 3.
Figure 8B:
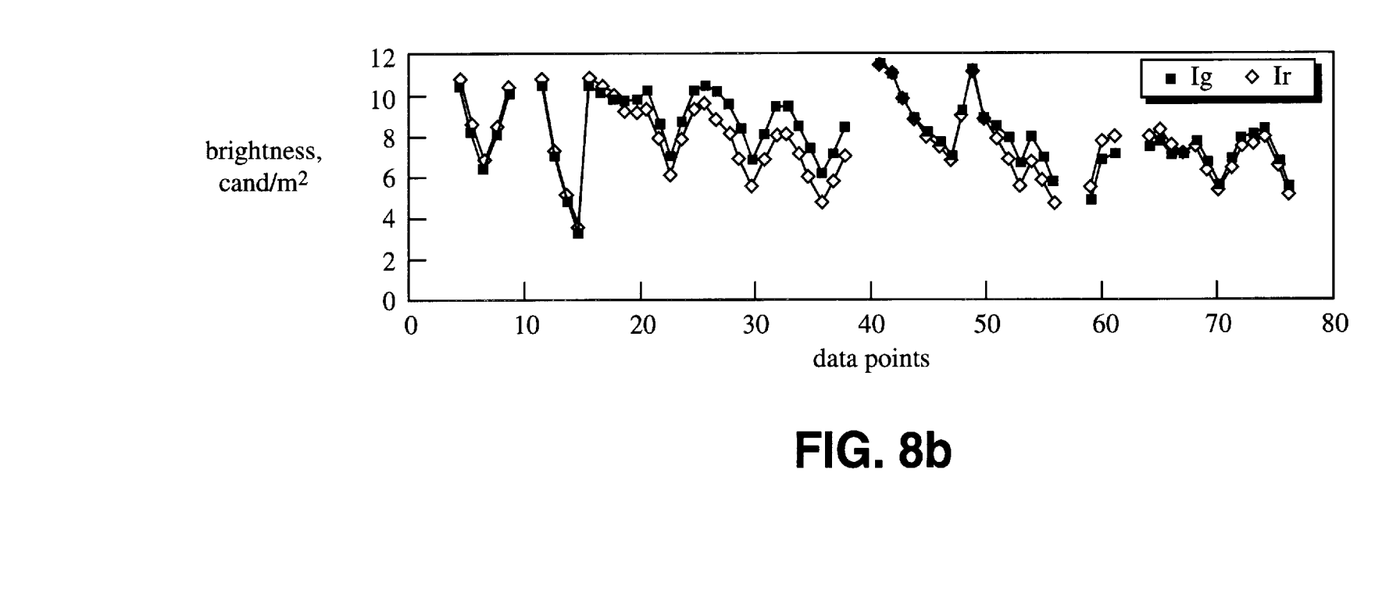
FIG. 8b is a graph showing brightness vs. data points for sample region 3.
Figure 8C:
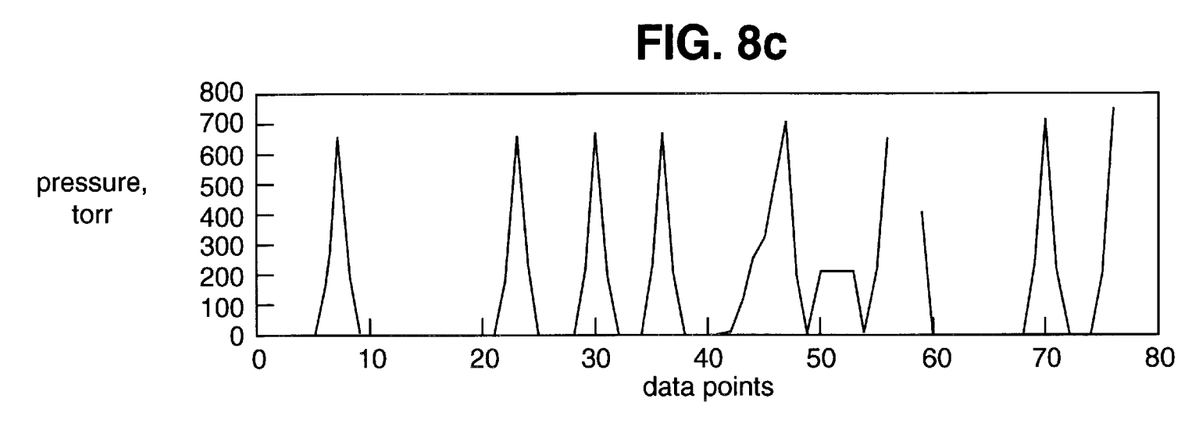
FIG. 8c is a graph showing pressure vs. data points for sample region 3.
Figure 8D:
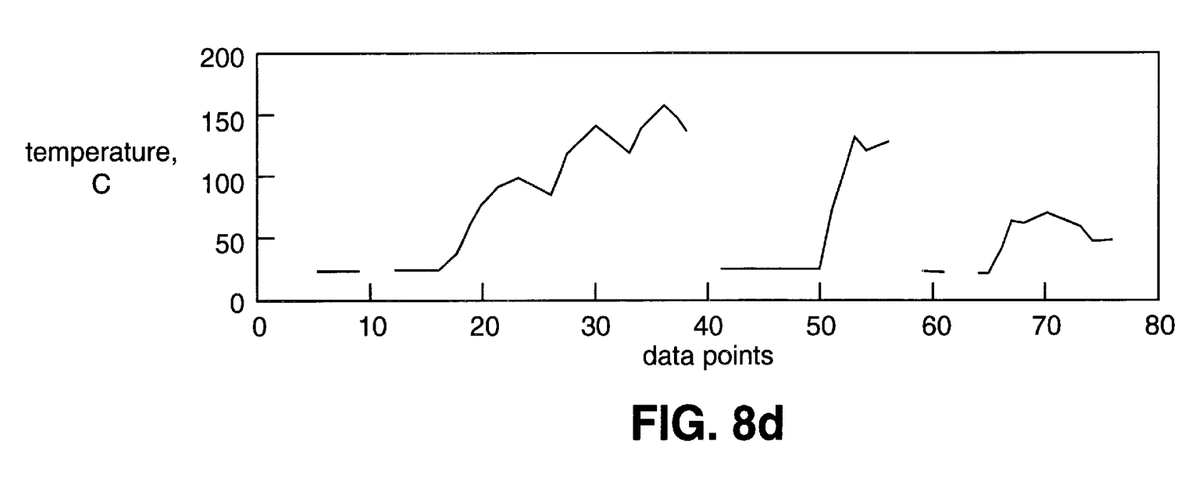
FIG. 8d is a graph showing temperature vs. data points for sample region 2.
Figure 9A:
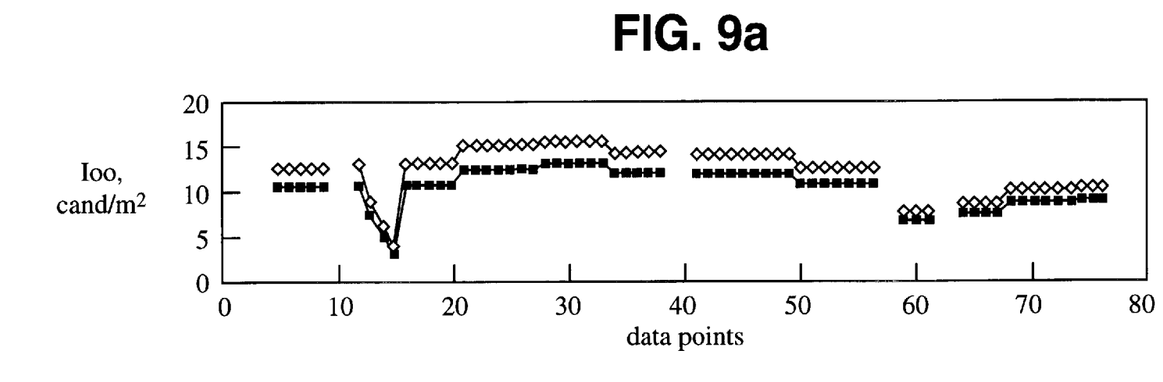
FIG. 9a is a graph showing reference brightness vs. data points.
Figure 9B:
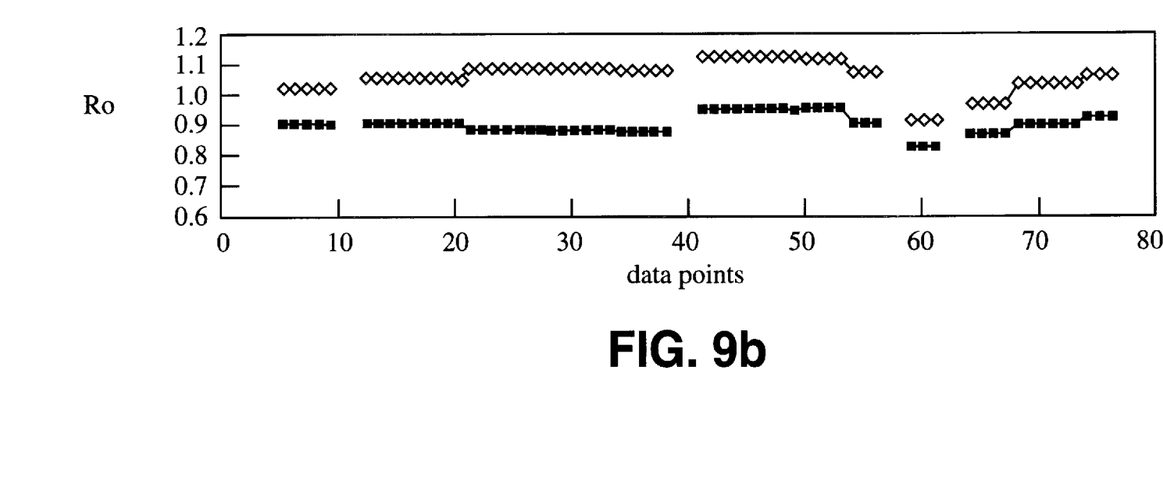
FIG. 9b is a graph showing reference color ratio vs. data points.
Figure 9C:
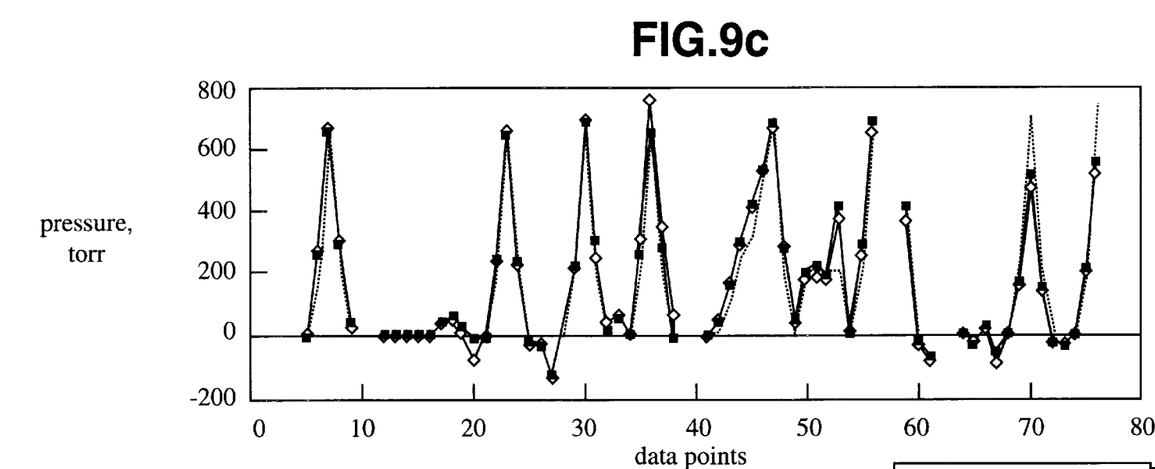
FIG. 9c is a graph showing luminescence pressure vs. data points.
Figure 9D:
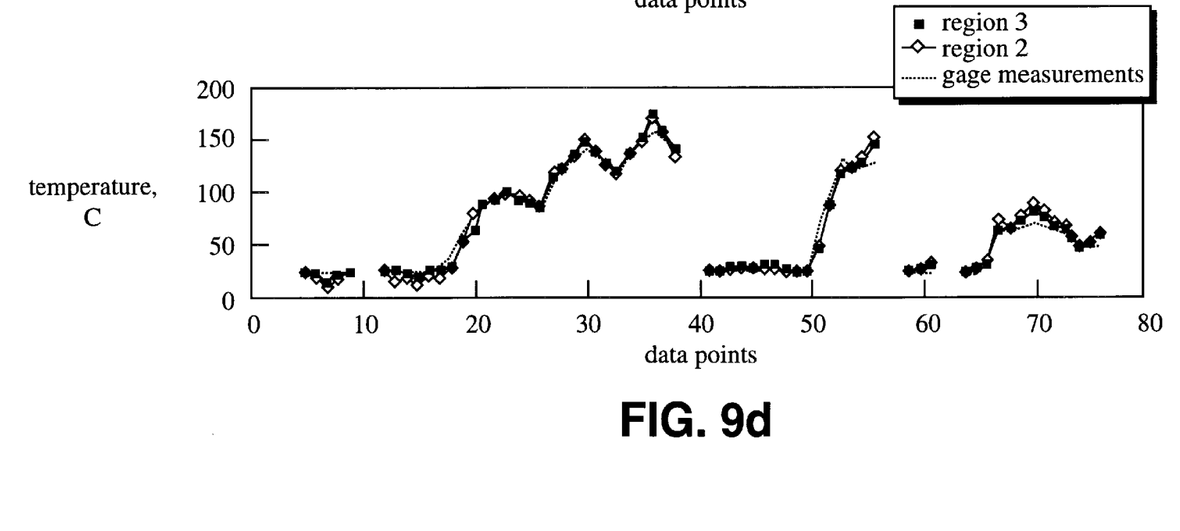
FIG. 9d is a graph showing temperature vs. data points.

UV irradiance values shown in FIG. 6(b) were monitored using a photoelectric detector attached to the window perimeter. A substantial drift is shown in irradiance values over the longest run. This detector was used in observations only and not in subsequent calculations. Irradiance was purposefully decreased for data points 12 though 14 using neutral density filters (N.D.=0.1, 0.2, and 0.3) in the beam path.

FIGS. 7 and 8 show the calibrated camera output in color ratio and individual brightness measurement for sample regions 2 and 3, respectively. It is noted that color ratio measurements are independent of pressure and irradiance and seem to follow closely thermocouple measurements. Apparent drifts, however, are shown between the color ratio and thermocouple measurements at constant temperatures, which seem to be associated with initial pump down from atmosphere. This may be attributed to atmospheric humidity, which was noticeably greater before the final run evacuation in comparison with initial run evacuation. These effects do not appear to be associated with cycling temperature or other forms of degradation. Suggested methods for wind-tunnel applications would include pulling down test section pressure several hours before run times to stabilize luminescence parameters. Maximum drift rates as demonstrated, however, are well within wind-tunnel run rates.

In FIG. 9 luminescence pressures and temperatures are determined using periodic "wind-off" calibrations ($I_{00}$ and $R_0$) at reference data points separately for regions 2 and 3. Previously noted drifts are shown in both reference brightness and color-ration calibration coefficients calculated at periodic intervals. The corresponding pressure and temperature model used in calculations ($K_0$, a, b and c) was shown in FIGS. 1 and 2.

Sensible pressure range as well as resolution is primarily limited by the dynamic resolution of the imaging system. In present measurements, video output is effectively digitized to less than 8-bits. Pressure measurement uncertainty can be derived as a quadratic function of pressure multiplied by relative brightness resolution from Eqn. (1), at constant temperature as $$dP = \frac{dI}{I_0} \frac{(1+KP)^2}{K} \qquad (6)$$

Figure 10A:
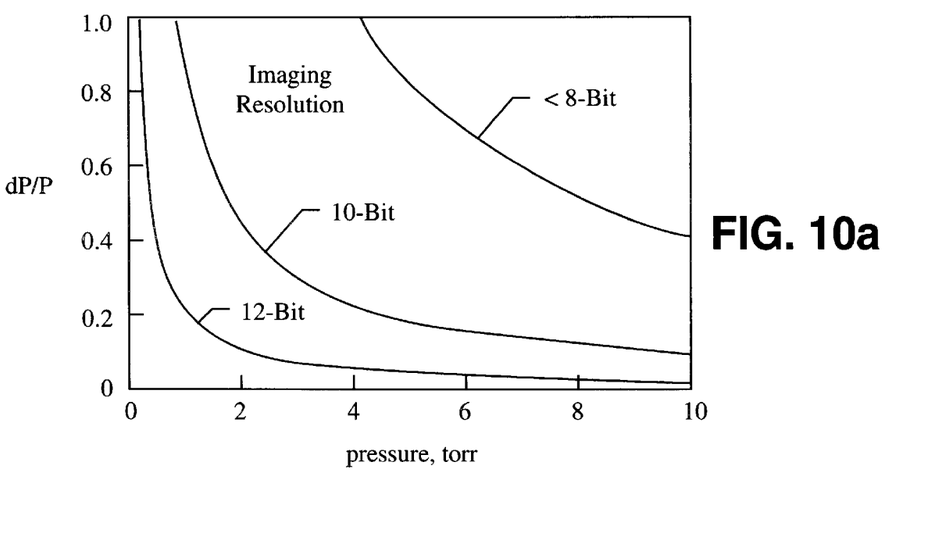
FIG. 10a is a graph showing relative pressure uncertainty for various imaging resolutions.
Figure 10B:
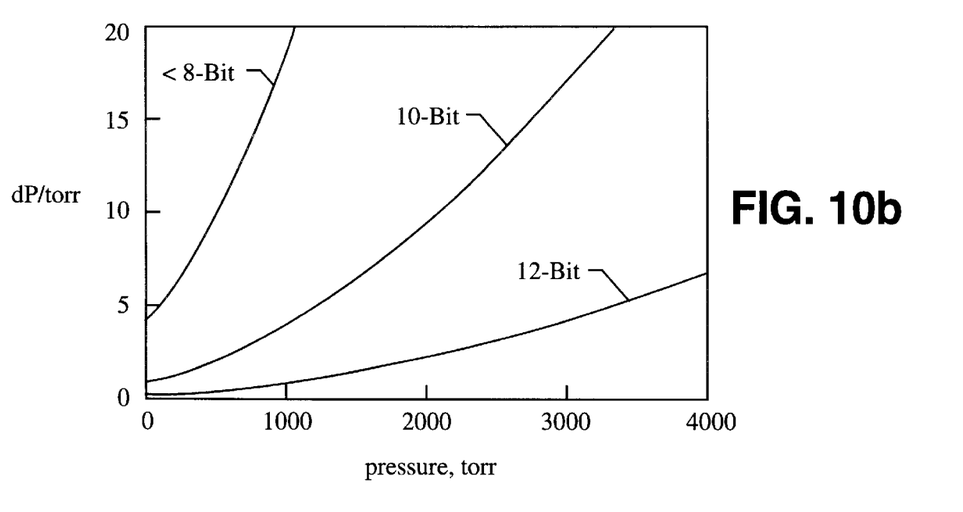
FIG. 10b is a graph showing absolute pressure uncertainty for various imaging resolutions.

Values of $I_0$/dl used in uncertainty calculations were 200, 1000 and 4000, respectively, for the present imaging system and performance estimates for 10-bit and 12-bit systems. FIGS. 10 (a) and (b) show calculations using Eqn. (6), and K=0.001 torr$^{-1}$ at 25° C., for relative pressure uncertainty in vacuum and absolute uncertainty over full range. Calculations show that the present system is operable from 5 torr to 1000 torr with greater than 1 signal-to-noise and from 0.5 torr to several atmospheres with higher imaging resolution.

Relatively bright luminescence was observed from adsorbed perylene dyes with blue-light excitation for temperatures up to 150° C. and greater in vacuum and atmosphere, and was measured using standard video. Comparative applications of a porphyrin dye were vaporized or permanently quenched under similar test conditions. A plot of Eqn. (4) with experimentally derived constants is shown in FIG. 2 for air pressure at constant temperatures.

In subsequent testing and later in wind-tunnel applications, pressure and temperature data are derived from Equations (4) and (5) in the following manner. First it is assumed that $K_0$, a, b, and c are constants which can be applied to all points on a sample or model surface. In a typical applications, a "wind-off" measurement is first made for static pressure, temperature and separate color brightness $P_1, T_1, l_{g_1}(x,y), l_{r_1}(x,y)$ $\rightarrow l_{00}(x,y), R_0(x,y)$ to determine reference brightness and color ratio coefficients at individual points on a surface. Then, during subsequent testing with flow conditions, color brightness images are recorded and processed with $l_{g_2}(x,y), l_{r_2}(x,y), [l_{00}(x,y), R_0(x,y)]$ $\rightarrow P_2(x,y), T_2(x,y)$ pre-run reference brightness and color ratio coefficients to determine in-situ pressures and temperatures on a surface.

Many improvements, modifications, and additions will be apparent to the skilled artisan without departing from the spirit and scope of the present invention as described herein and defined in the following claims.

What is claimed is:

1. A method for simultaneous mapping of temperature and pressure on an member, comprising:

applying exactly one luminescent material to the surface of the member;

exciting the luminescent material;

measuring the resulting emissions; and determining the pressure and temperature on the surface of the member.

2. The mapping method of claim 1 wherein the luminescent material is perylene dye.

3. The mapping method of claim 1 wherein the luminescent material is excited using a blue light.

4. The mapping method of claim I wherein the luminescent material is excited using long-wave ultraviolet light.

5. The mapping method of claim 1 wherein the resulting emissions are measured using a two-color imaging system.

6. The mapping method of claim 1 wherein the luminescent material is applied by:

polishing the surface of the member;

saturating the surface with the luminescent material;

heating the saturated member; and repolishing the heated member.

7. The mapping method of claim 1 wherein the member is a ceramic model.

8. The mapping method of claim 7 wherein the ceramic model is a slip casted ceramic.

* * * * *